US011927070B2

(12) United States Patent
Lymberopoulos et al.

(10) Patent No.: US 11,927,070 B2
(45) Date of Patent: Mar. 12, 2024

(54) INTEGRATED VALVE SKID APPARATUS AND RELATED METHODS FOR WELLHEAD SYSTEMS

(71) Applicant: SAFOCO, INC., Houston, TX (US)

(72) Inventors: David Lymberopoulos, Houston, TX (US); James Eric Amberg, Cleveland, TX (US); John Paul Latz, Katy, TX (US); Andrew Allen Kadavy, Houston, TX (US)

(73) Assignee: SAFOCO, INC., Houston, TX (US)

( * ) Notice: Subject to any disclaimer, the term of this patent is extended or adjusted under 35 U.S.C. 154(b) by 165 days.

(21) Appl. No.: 17/592,060

(22) Filed: Feb. 3, 2022

(65) Prior Publication Data

US 2023/0243236 A1 Aug. 3, 2023

(51) Int. Cl.
*E21B 34/02* (2006.01)
*F16K 27/02* (2006.01)
*F16K 27/04* (2006.01)

(52) U.S. Cl.
CPC .......... *E21B 34/02* (2013.01); *F16K 27/0209* (2013.01); *F16K 27/044* (2013.01)

(58) Field of Classification Search
CPC ..... E21B 34/02; F16K 27/0209; F16K 27/044
USPC ........................................................ 166/316
See application file for complete search history.

(56) References Cited

U.S. PATENT DOCUMENTS

| | | | |
|---|---|---|---|
| 9,103,465 B2 | 8/2015 | Lymberopoulos | |
| 9,163,619 B2 | 10/2015 | Lymberopoulos | |
| 9,441,453 B2 | 9/2016 | Lymberopoulos et al. | |
| 9,671,794 B1 | 6/2017 | Lymberopoulos et al. | |
| 9,890,609 B2 | 2/2018 | Lymberopoulos et al. | |
| 11,384,876 B2 | 7/2022 | Kadavy | |
| 11,506,006 B2 | 11/2022 | Lymberopoulos et al. | |
| 11,519,536 B2 | 12/2022 | Lymberopoulos et al. | |
| 11,530,601 B2 | 12/2022 | Lymberopoulos et al. | |
| 2018/0283618 A1 | 10/2018 | Cook | |
| 2020/0048980 A1 | 2/2020 | Jespersen et al. | |
| 2020/0284122 A1 | 9/2020 | Golden et al. | |
| 2021/0156241 A1* | 5/2021 | Cook | F04B 53/16 |
| 2021/0372548 A1 | 12/2021 | Post | |

FOREIGN PATENT DOCUMENTS

| | | | |
|---|---|---|---|
| CN | 102787833 B | 4/2015 | |
| CN | 212583680 U | 2/2021 | |

OTHER PUBLICATIONS

International Search Report and Written Opinion for PCT/US2023/060876 dated Apr. 4, 2023.

* cited by examiner

*Primary Examiner* — Matthew R Buck
*Assistant Examiner* — Patrick F Lambe
(74) *Attorney, Agent, or Firm* — Patterson + Sheridan, LLP

(57) ABSTRACT

Aspects of the present disclosure relate to valve skid apparatus and related methods for wellhead systems. A check block of the check valve includes a check side face that interfaces with a gate side face of a gate block of the gate valve. A pump side block is coupled to the gate valve, and a well side block is coupled to the check valve. A first pressure relief valve is coupled to a top face of the pump side block, and a first bleed-off valve is coupled to a top face of the first pressure relief valve. A second pressure relief valve is coupled to a top face of the well side block, and a second bleed-off valve is coupled to a top face of the second pressure relief valve.

20 Claims, 14 Drawing Sheets

INTEGRATED VALVE SKID APPARATUS AND RELATED METHODS FOR WELLHEAD SYSTEMS

BACKGROUND

Field

Aspects of the present disclosure relate to valve skid apparatus and related methods for wellhead systems. In one aspect, a valve skid is an integrated valve skid that includes a check valve coupled to a gate valve.

Description of the Related Art

Wellhead systems (such as equipment for delivering fluids to wellheads) can take up space at wellsites, require multiple skids to operate, and incur excess costs to manufacture and operate. As an example, check valves can be on skids different than isolation valves, requiring additional skids and other components, such as flanged connections and flow iron connections. The multiple components of wellhead systems can also increase weights of the wellhead system, which can delay operations, increase costs, and require increased expenditure of resources to deploy and use the components.

Therefore, there is a need in the art for wellhead systems that facilitate reduced numbers of skids and other components, less footprints, reduced costs, reduced weights, reduced expenditure of resources, reduced operational times, and enhanced operational efficiencies.

SUMMARY

Aspects of the present disclosure relate to valve skid apparatus and related methods for wellhead systems. In one aspect, a valve skid is an integrated valve skid that includes a check valve coupled to a gate valve.

In one implementation, a valve skid for disposition between a pump manifold and a wellhead structure includes a gate valve having a gate block. The gate block includes a first gate side face and a second gate side face. The valve skid includes a check valve coupled to the gate valve. The check valve includes a check block. The check block includes a first check side face and a second check side face. The first check side face interfaces with the second gate side face. The valve skid includes a pump side block coupled to the gate valve. The pump side block includes a first side face and a second side face. The second side face of the pump side block interfaces with the first gate side face. The valve skid includes a well side block coupled to the check valve. The well side block includes a first side face and a second side face. The first side face of the well side block interfaces with the second check side face.

In one implementation, a valve skid for disposition between a pump manifold and a wellhead structure includes a gate valve having a gate block. The gate block includes a first gate side face and a second gate side face. The valve skid includes a check valve coupled to the gate valve. The check valve includes a check block. The check block includes a first check side face and a second check side face. The first check side face interfaces with the second gate side face. The valve skid includes a pump side block coupled to the gate valve. The pump side block includes a first side face and a second side face. The second side face of the pump side block interfaces with the first gate side face. The pump side block includes a central opening, and a plurality of first openings disposed outwardly of the central opening of the pump side block and extending partially into the first side face of the pump side block. The pump side block includes a plurality of second openings disposed outwardly of the central opening of the pump side block and extending partially into the second side face of the pump side block. The pump side block includes a plurality of third openings disposed outwardly of the plurality of first openings of the pump side block and outwardly of the plurality of second openings of the pump side block. The valve skid includes a well side block coupled to the check valve. The well side block includes a first side face. The first side face of the well side block interfaces with the second check side face. The well side block includes a second side face and a central opening. The well side block includes a plurality of first openings disposed outwardly of the central opening of the well side block and extending partially into the first side face of the well side block. The well side block includes a plurality of second openings disposed outwardly of the central opening of the well side block and extending partially into the second side face of the well side block. The well side block includes a plurality of third openings disposed outwardly of the plurality of first openings of the well side block and outwardly of the plurality of second openings of the well side block.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
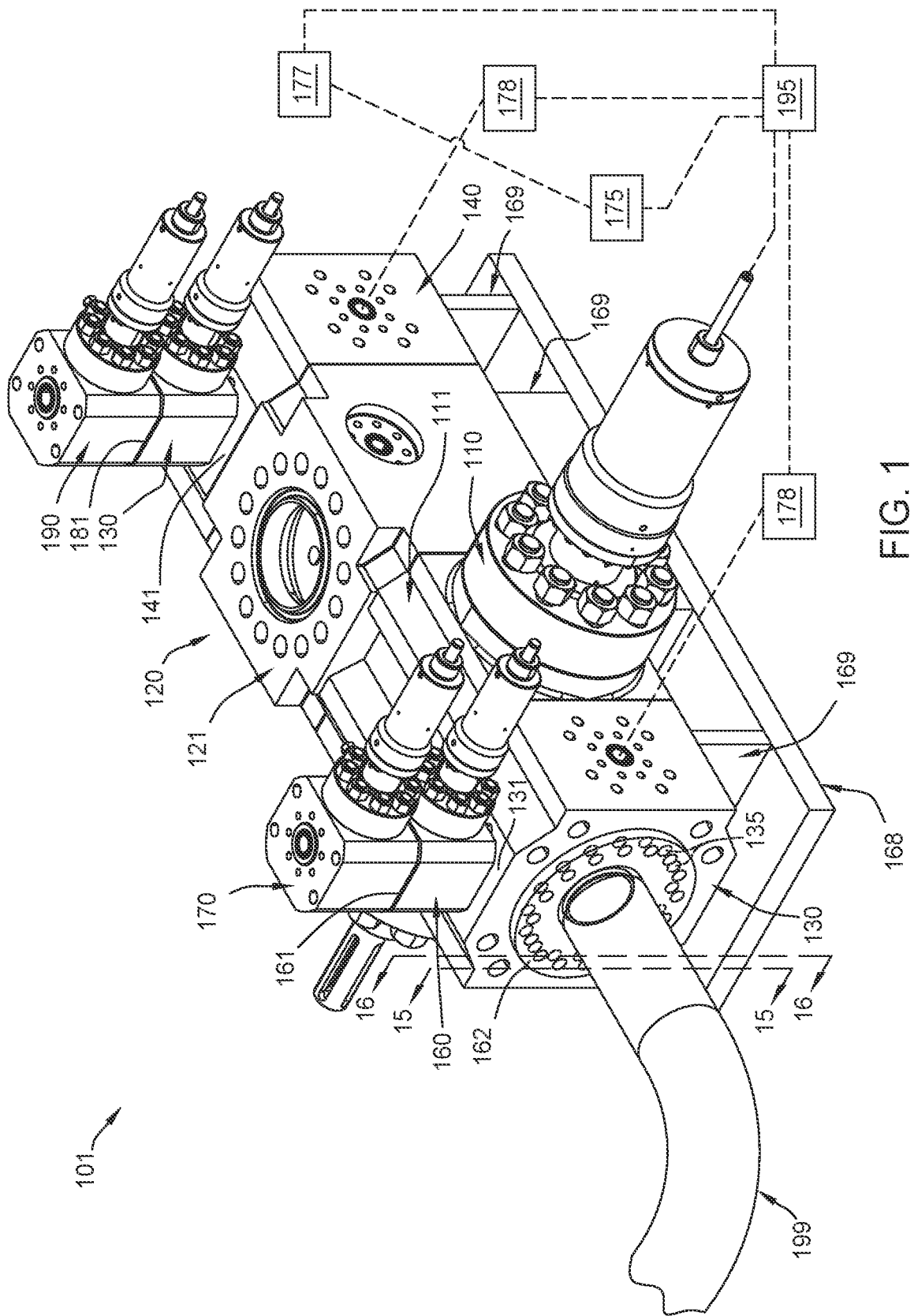
FIG. 1 is a schematic isometric top-left-front view of a valve skid of a wellhead system, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to valve skid apparatus and related methods for wellhead systems. In one aspect, a valve skid is an integrated valve skid that includes a check valve coupled to a gate valve. A check block of the check valve includes a check side face that interfaces with a gate side face of a gate block of the gate valve. A pump side block is coupled to the gate valve, and a well side block is coupled to the check valve. A first pressure relief valve is coupled to a top face of the pump side block, and a first bleed-off valve is coupled to a top face of the first pressure relief valve. A second pressure relief valve is coupled to a top face of the well side block, and a second bleed-off valve is coupled to a top face of the second pressure relief valve. In one aspect, the gate valve, the check valve, the pump side block, and the well side block are coupled together without a flanged connection, a flow iron connection, or a flexible hose connection positioned therebetween.

The disclosure contemplates that terms such as "couples," "coupling," "couple," and "coupled" may include but are not limited to welding, interference fitting, and/or fastening such as by using bolts, threaded connections, pins, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links.

Figure 2:
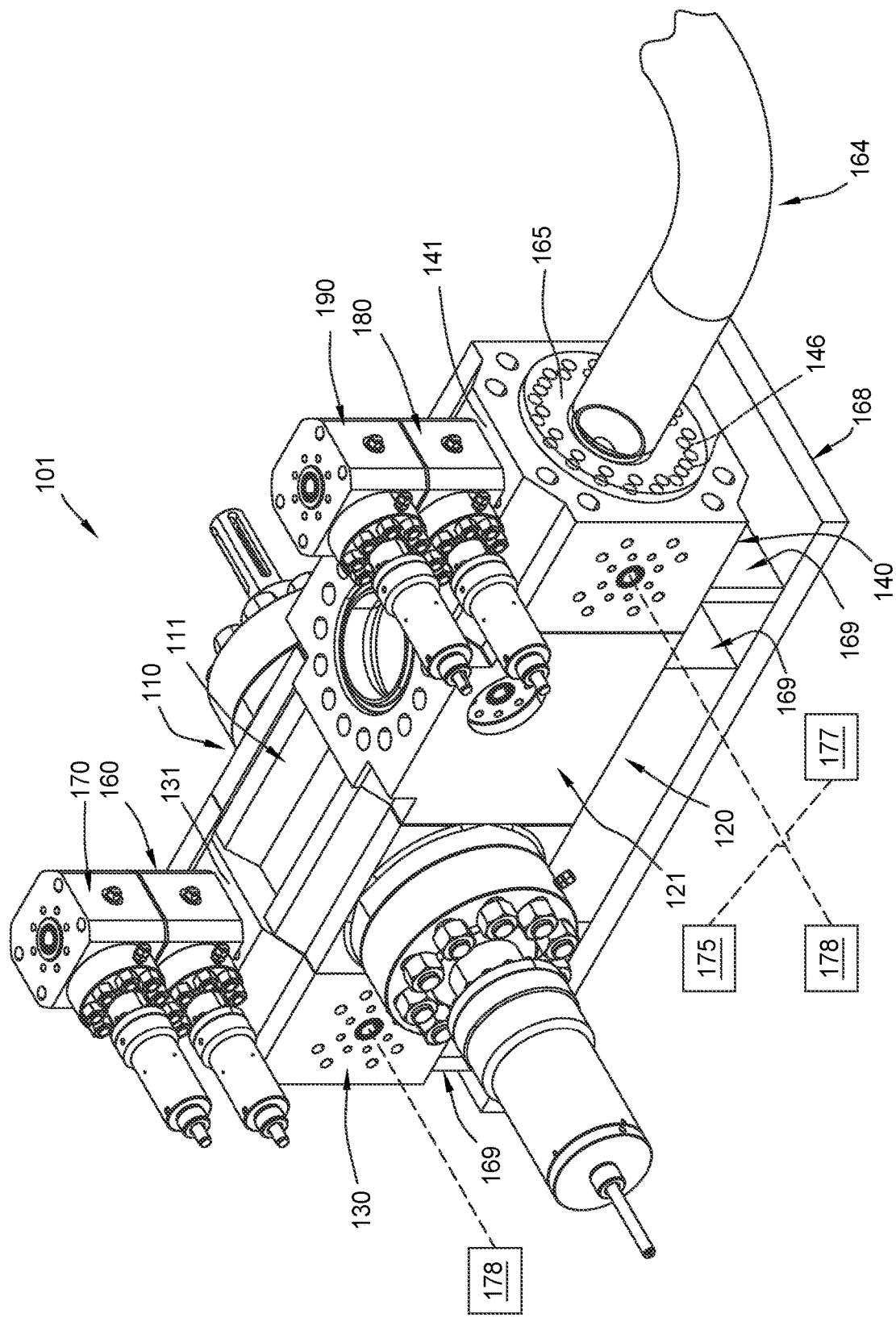
FIG. 2 is a schematic isometric top-right-front view of the valve skid shown in FIG. 2, according to one implementation.

FIG. 1 is a schematic isometric top-left-front view of a valve skid 101 of a wellhead system, according to one implementation. FIG. 2 is a schematic isometric top-right-front view of the valve skid 101 shown in FIG. 2, according to one implementation.

The valve skid 101 includes a gate valve 110 having a gate block 111, and a check valve 120 coupled to the gate valve 110. The check valve 120 includes a check block 121 coupled to the gate block 111. A pump side block 130 is coupled to the gate block 111 of the gate valve 110. A well side block 140 is coupled to the check block 121 of the check valve 120.

The valve skid 101 includes a first pressure relief valve 160 coupled to a top face 131 of the pump side block 130, and a first bleed-off valve 170 coupled to a top face 161 of the first pressure relief valve 160. The valve skid 101 includes a second pressure relief valve 180 coupled to a top face 141 of the well side block 140, and a second bleed-off valve 190 coupled to a top face 181 of the second pressure relief valve 180.

Figure 16:
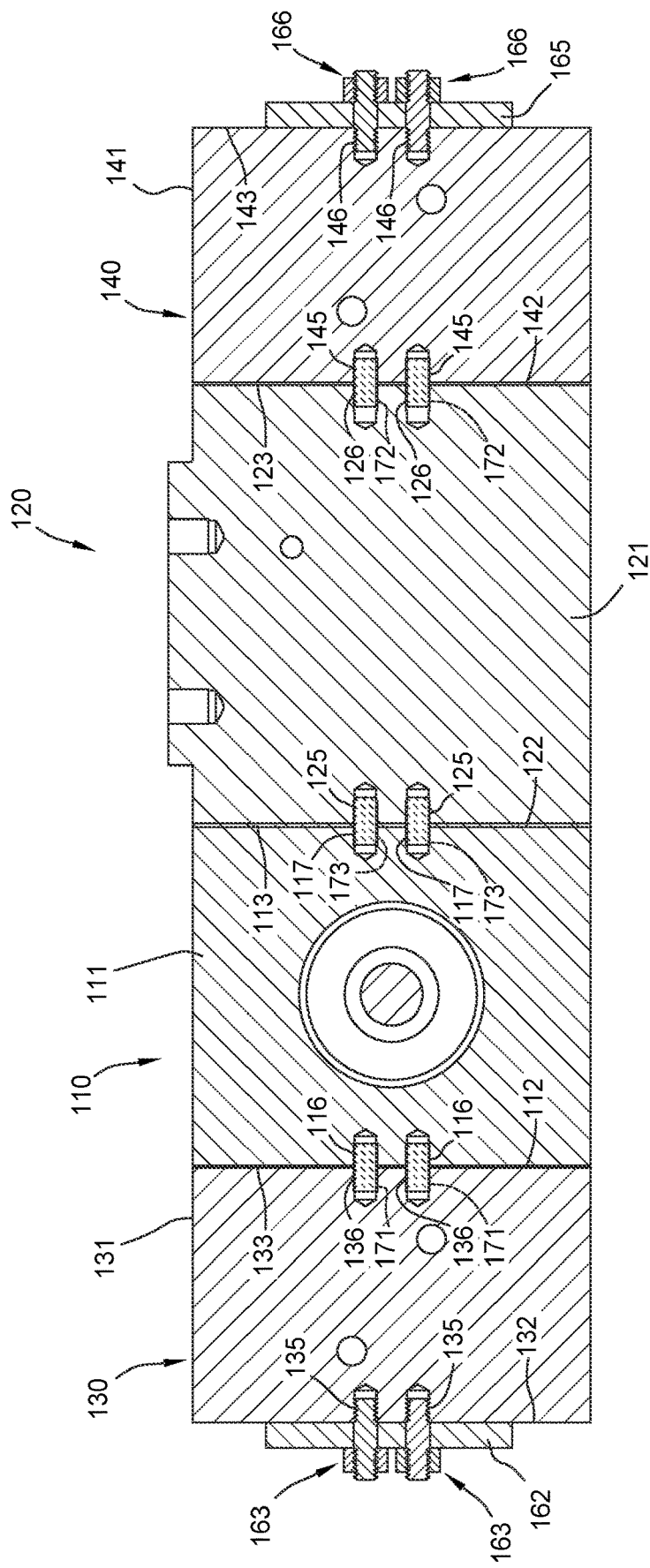
FIG. 16 is a schematic cross-sectional side view of the valve skid shown in FIGS. 1 and 2, along Section 16-16, according to one implementation.

A first flange 162 of a first conduit 199 (such as a flexible hose) is coupled to the pump side block 130 using the first openings 135 and first fasteners 163 (shown in FIG. 16). The first conduit 199 provides an operations fluid (such as a frac fluid) from a pump manifold to the valve skid 101 through the pump side block 130. The operations fluid flows from the pump side block 130, through the gate valve 110, through the check valve 120, and into the well side block 140. The operations fluid flows from the well side block 140 and into a second conduit 164. The operations fluid flows from the second conduit 164 and into a plurality of wells through a plurality of wellhead structures (such as Christmas trees). A second flange 165 of the second conduit 164 (such as a flexible hose) is coupled to the well side block 140 using the second openings 146 and second fasteners 166 (shown in FIG. 16).

The pump side block 130, the gate valve 110, the check valve 120, and the well side block 140 are supported on an instrumentation skid 168 using one or more support members, referred to herein as saddles 169 (three saddles 169 are shown).

The valve skid 101 includes one or more metering valves 175 and/or one or more flow composition valves 177. In one embodiment, which can be combined with other embodiments, the one or more metering valves 175 and/or the one or more flow composition valves 177 are fluidly connected to the pump side block 130 and/or the well side block 140. The present disclosure contemplates that the one or more metering valves 175 and/or the one or more flow composition valves 177 can be fluidly connected to the gate valve 110 and/or the check valve 120. In one embodiment, which can be combined with other embodiments, one or more pressure transducers 178 (two are shown) are fluidly connected to the valve skid 101. Indications (e.g., pressure signals) of the one or more pressure transducers 178 are used to determine a flow direction of operations fluid flowing through the valve skid 101. For example, flow direction can be detected by the one or more pressure transducers 178 via pressure differentials between two pressure transducers 178. The pressure transducer 178 that the flow is flowing toward will read higher than the pressure transducer 178 that the flow is flowing away from. The flow direction can be used, such as by a controller 195, to actuate the gate valve 110 open and closed. The controller 195 can include instructions (such as software) stored on a memory that, when executed by a processor, control the operations of the valve skid 101. In one embodiment, which can be combined with other embodiments, the flow direction is used by the controller 195 to actuate the gate valve 110 open and closed using simple automation module for internet explorer (SAMI) automation software. In such an embodiment, the check valve 120 can be included or omitted such that the second gate side face 113 (further described below) interfaces with the first side face 142 (further described below) of the well side block 140.

Figure 3:
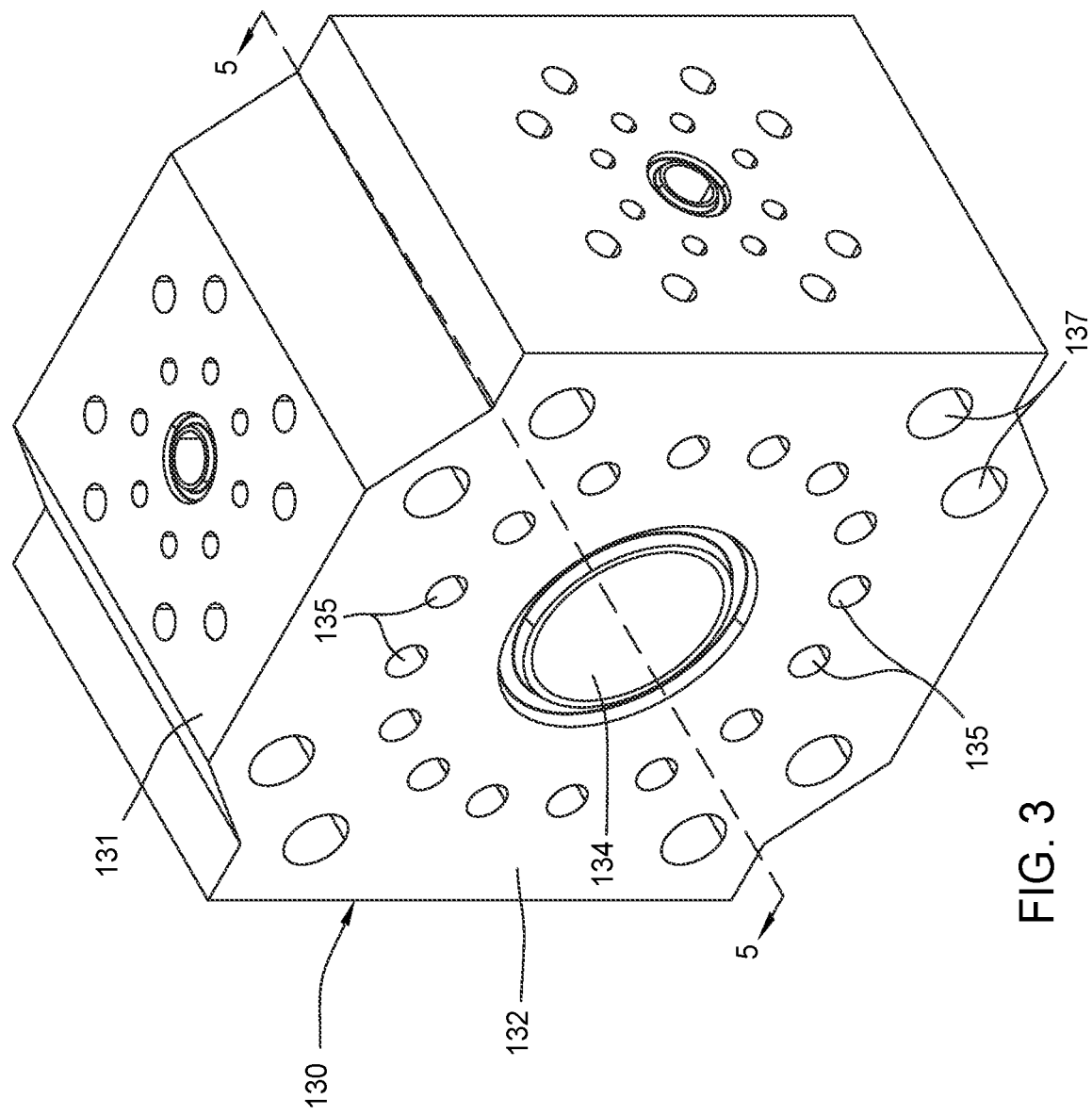
FIG. 3 is a schematic isometric front view of the pump side block shown in FIGS. 1 and 2, according to one implementation.
Figure 4:
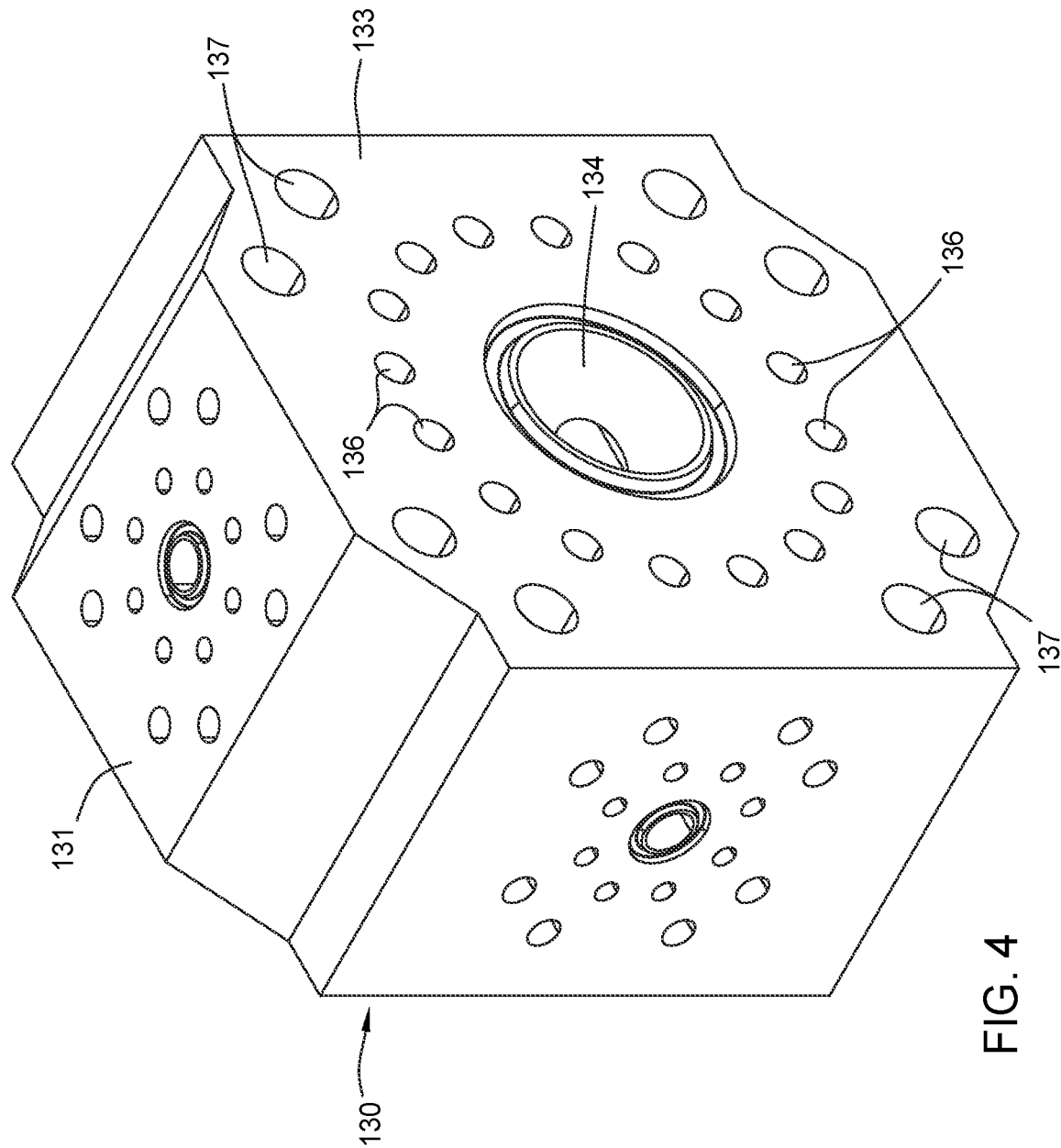
FIG. 4 is a schematic isometric back view of the pump side block shown in FIGS. 1 and 2, according to one implementation.
Figure 5:
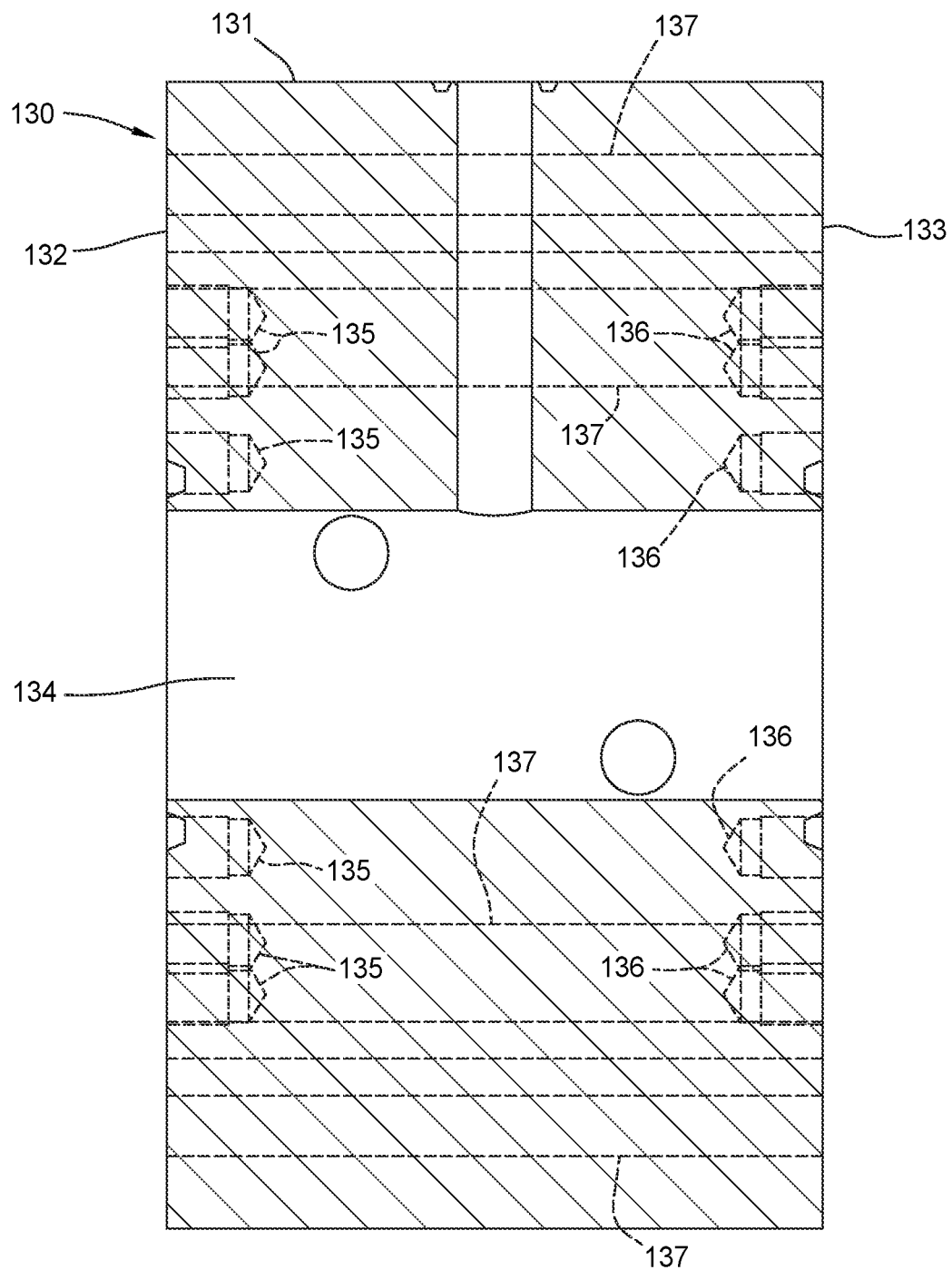
FIG. 5 is a schematic cross-sectional side view of the pump side block shown in FIG. 3, along Section 5-5, according to one implementation.

FIG. 3 is a schematic isometric front view of the pump side block 130 shown in FIGS. 1 and 2, according to one implementation. FIG. 4 is a schematic isometric back view of the pump side block 130 shown in FIGS. 1 and 2, according to one implementation. FIG. 5 is a schematic cross-sectional side view of the pump side block 130 shown in FIG. 3, along Section 5-5, according to one implementation.

The pump side block 130 includes a first side face 132, a second side face 133, and a central opening 134. The pump side block 130 includes a plurality of first openings 135 (sixteen are shown) disposed outwardly of the central opening 134 of the pump side block 130 and extending partially into the first side face 132 of the pump side block 130. The pump side block 130 includes a plurality of second openings 136 (sixteen are shown) disposed outwardly of the central opening 134 of the pump side block 130 and extending partially into the second side face 133 of the pump side block 130. The pump side block 130 includes a plurality of third openings 137 (eight are shown) disposed outwardly of the plurality of first openings 135 of the pump side block 130 and outwardly of the plurality of second openings 136 of the pump side block 130. The third openings 137 extend from the first side face 132 and to the second side face 133.

Figure 6:
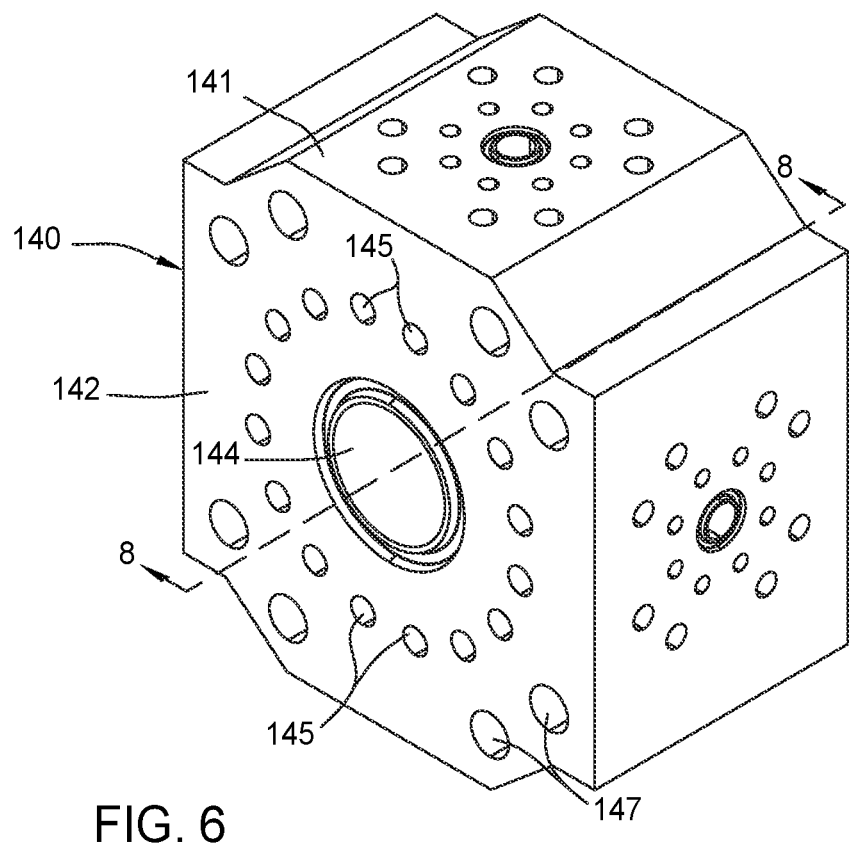
FIG. 6 is a schematic isometric front view of the well side block shown in FIGS. 1 and 2, according to one implementation.
Figure 7:
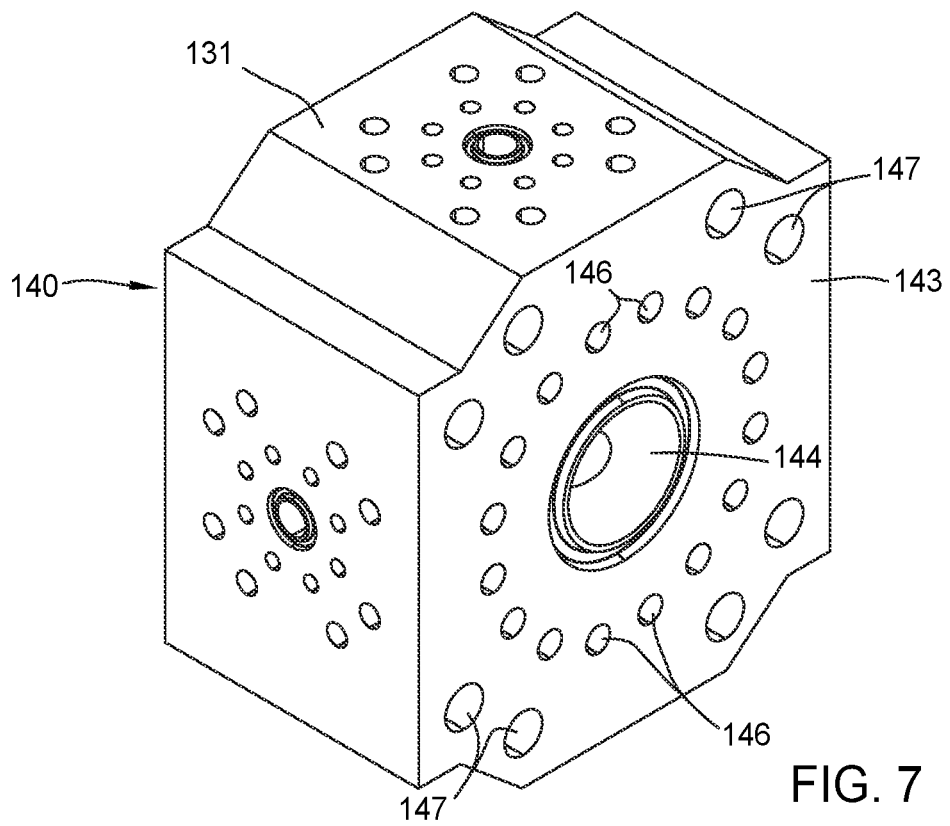
FIG. 7 is a schematic isometric back view of the well side block shown in FIGS. 1 and 2, according to one implementation.
Figure 8:
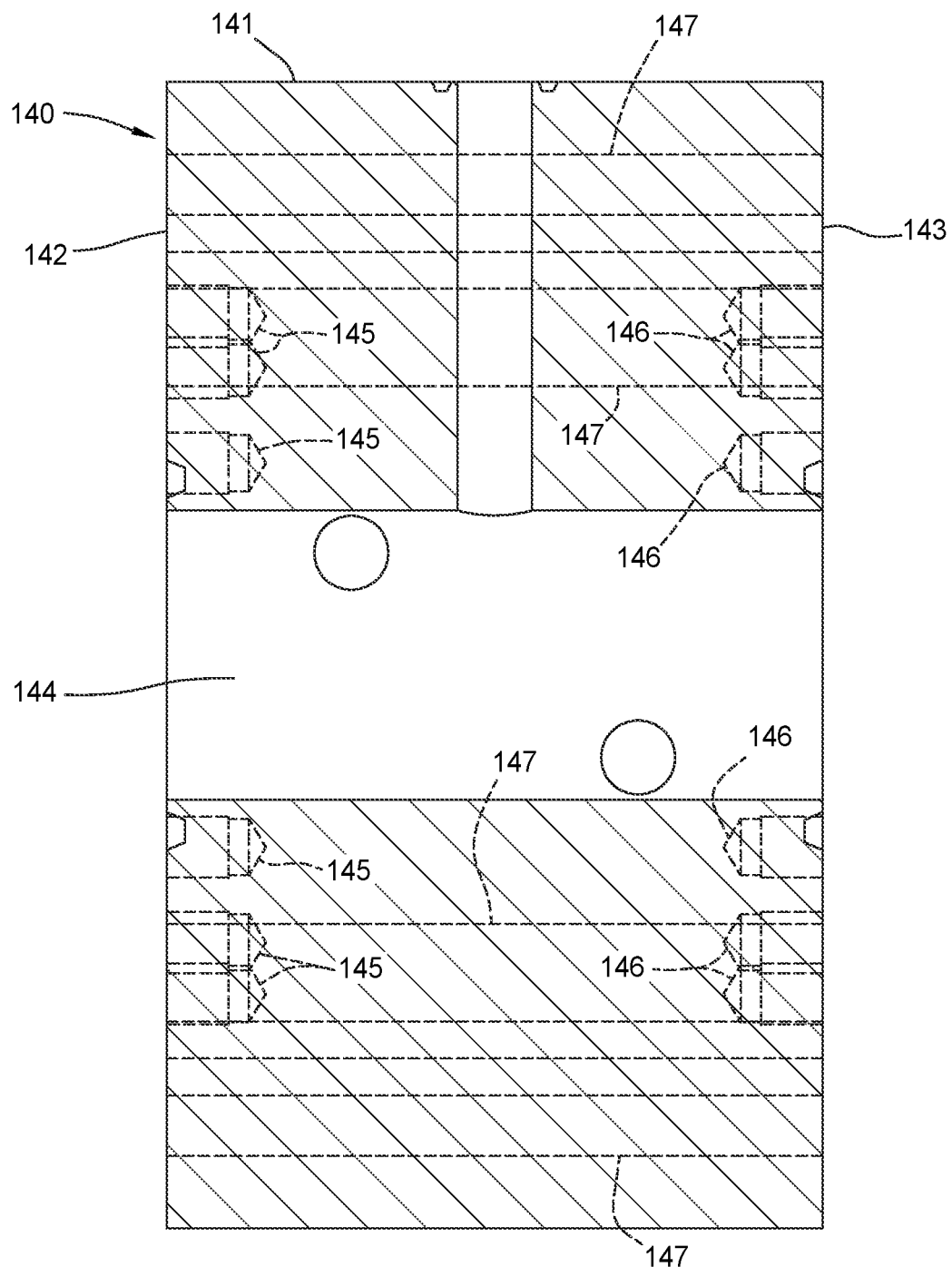
FIG. 8 is a schematic cross-sectional side view of the well side block shown in FIG. 6, along Section 8-8, according to one implementation.

FIG. 6 is a schematic isometric front view of the well side block 140 shown in FIGS. 1 and 2, according to one implementation. FIG. 7 is a schematic isometric back view of the well side block 140 shown in FIGS. 1 and 2, according to one implementation. FIG. 8 is a schematic cross-sectional side view of the well side block 140 shown in FIG. 6, along Section 8-8, according to one implementation.

The well side block 140 includes a first side face 142, a second side face 143, and a central opening 144. The well side block 140 includes a plurality of first openings 145 (sixteen are shown) disposed outwardly of the central opening 144 of the well side block 140 and extending partially into the first side face 142 of the well side block 140. The well side block 140 includes a plurality of second openings 146 (sixteen are shown) disposed outwardly of the central opening 144 of the well side block 140 and extending partially into the second side face 143 of the well side block 140. The well side block 140 includes a plurality of third openings 147 (eight are shown) disposed outwardly of the plurality of first openings 145 of the well side block 140 and outwardly of the plurality of second openings 146 of the well side block 140. The third openings 147 extend from the first side face 142 and to the second side face 143.

Figure 9:
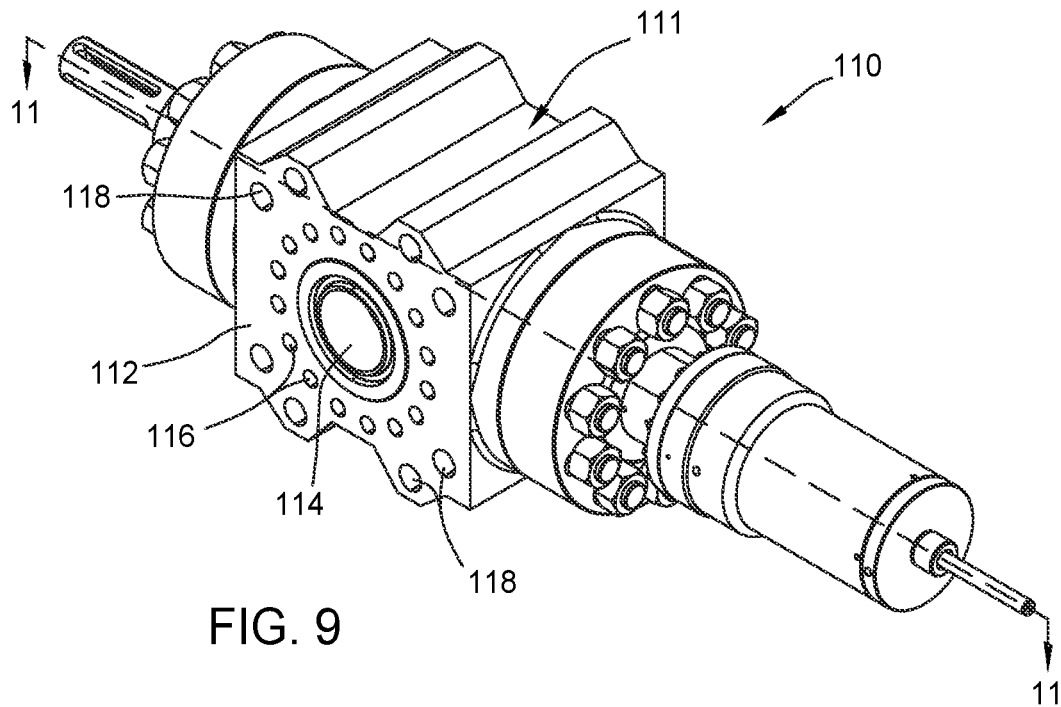
FIG. 9 is a schematic isometric front view of the gate valve shown in FIGS. 1 and 2, according to one implementation.
Figure 10:
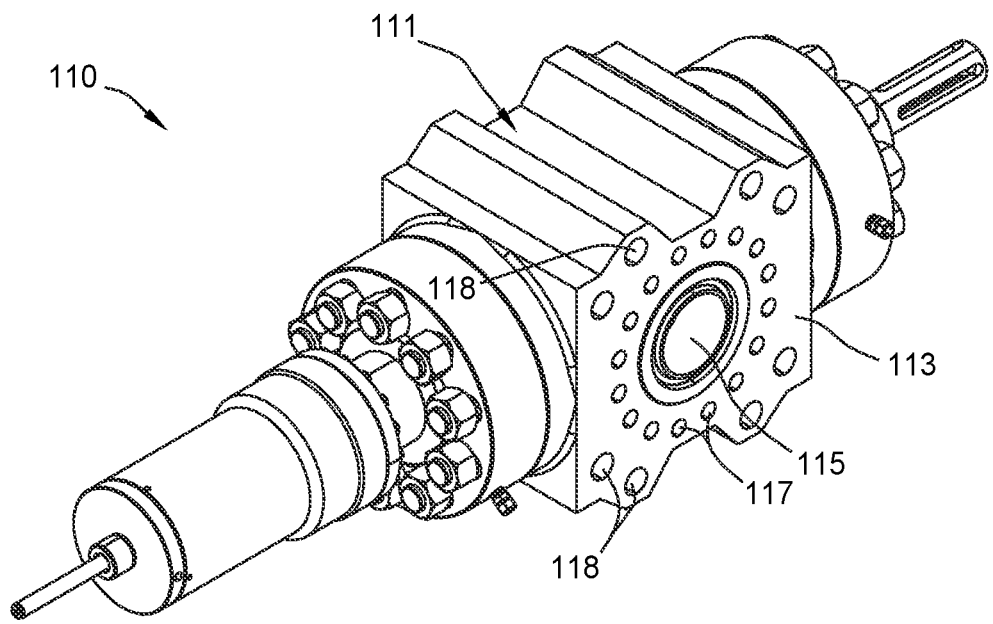
FIG. 10 is a schematic isometric back view of the gate valve shown in FIGS. 1 and 2, according to one implementation.
Figure 11:
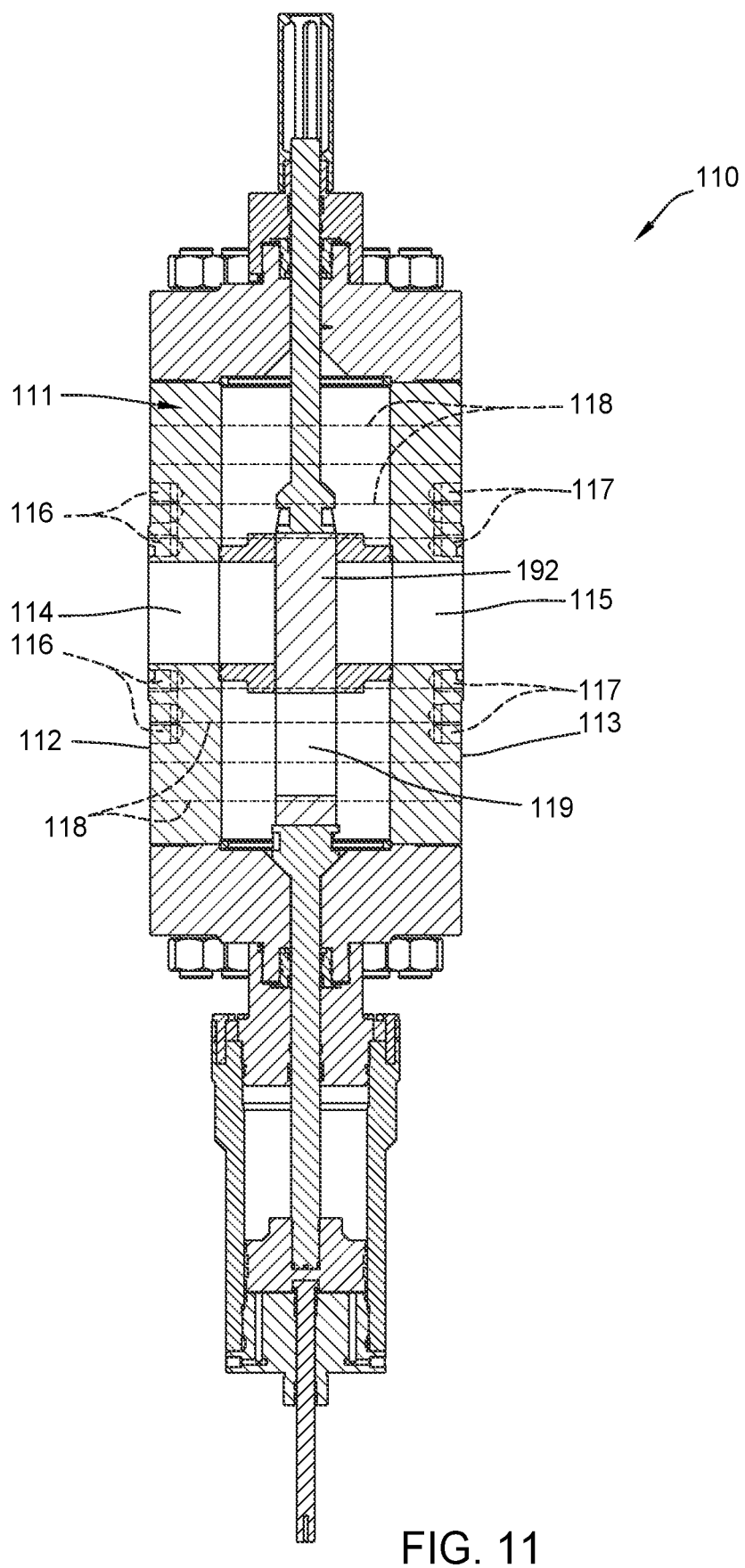
FIG. 11 is a schematic cross-sectional side view of the gate valve shown in FIG. 9, along Section 11-11, according to one implementation.

FIG. 9 is a schematic isometric front view of the gate valve 110 shown in FIGS. 1 and 2, according to one implementation. FIG. 10 is a schematic isometric back view of the gate valve 110 shown in FIGS. 1 and 2, according to one implementation. FIG. 11 is a schematic cross-sectional side view of the gate valve 110 shown in FIG. 9, along Section 11-11, according to one implementation.

The gate valve 110 includes the gate block 111. The gate block 111 includes a first gate side face 112 and a second gate side face 113. The second side face 133 of the pump side block 130 interfaces with the first gate side face 112 of the gate block 111. The gate block 111 includes a first central opening 114 extending into the first gate side face 112 and aligned with the central opening 134 of the pump side block 130, and a second central opening 115 extending into the second gate side face 113. The gate block 111 includes a plurality of first gate openings 116 disposed outwardly of the first central opening 114 of the gate block 111 and extending partially into the first gate side face 112 of the gate block 111. The plurality of first gate openings 116 are aligned with the plurality of second openings 136 of the pump side block 130. The gate block 111 includes a plurality of second gate openings 117 disposed outwardly of the second central opening 115 of the gate block 111 and extending partially into the second gate side face 113 of the gate block 111. The gate block 111 includes a plurality of third gate openings 118 disposed outwardly of the plurality of first gate openings 116 of the gate block 111 and outwardly of the plurality of second gate openings 117 of the gate block 111. The plurality of third gate openings 118 are aligned with the plurality of third openings 137 of the pump side block 130.

The gate valve 110 includes a movable gate 192 positioned within the gate block 111. The movable gate 192 includes a gate opening 119 configured to align with the first central opening 114 of the gate block 111 and the second central opening 115 of the gate block 111.

Figure 12:
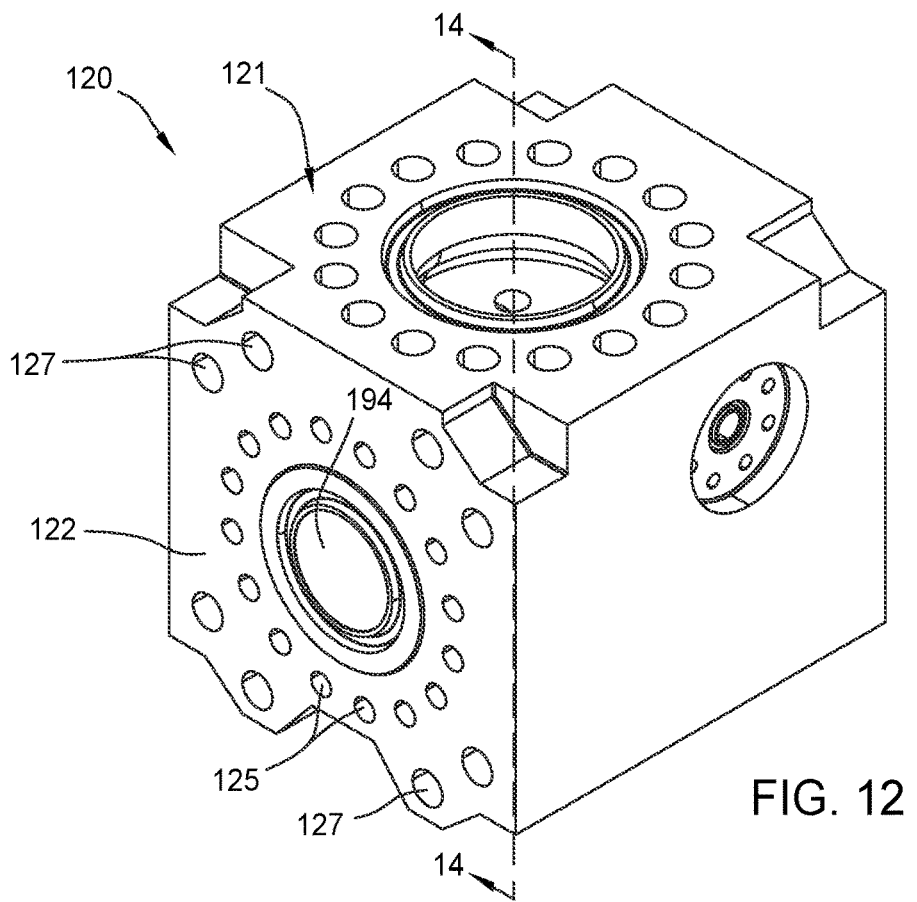
FIG. 12 is a schematic isometric front view of the check valve shown in FIGS. 1 and 2, according to one implementation.
Figure 13:
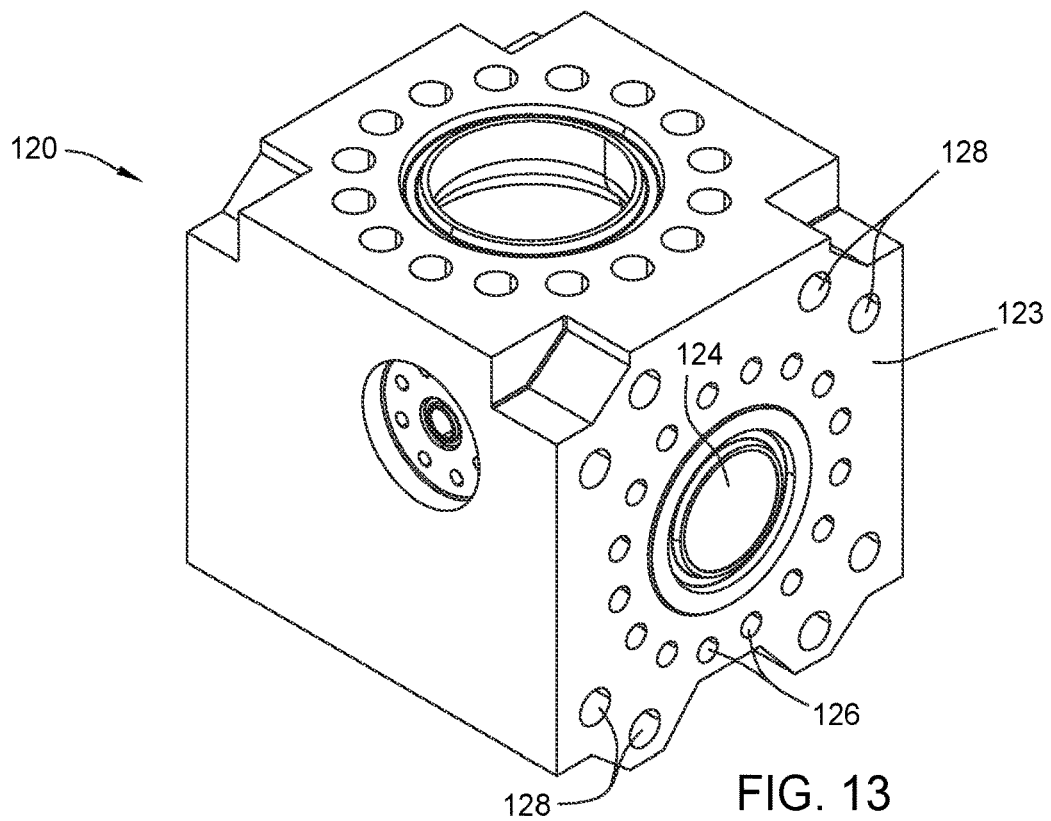
FIG. 13 is a schematic isometric back view of the check valve shown in FIGS. 1 and 2, according to one implementation.
Figure 14:
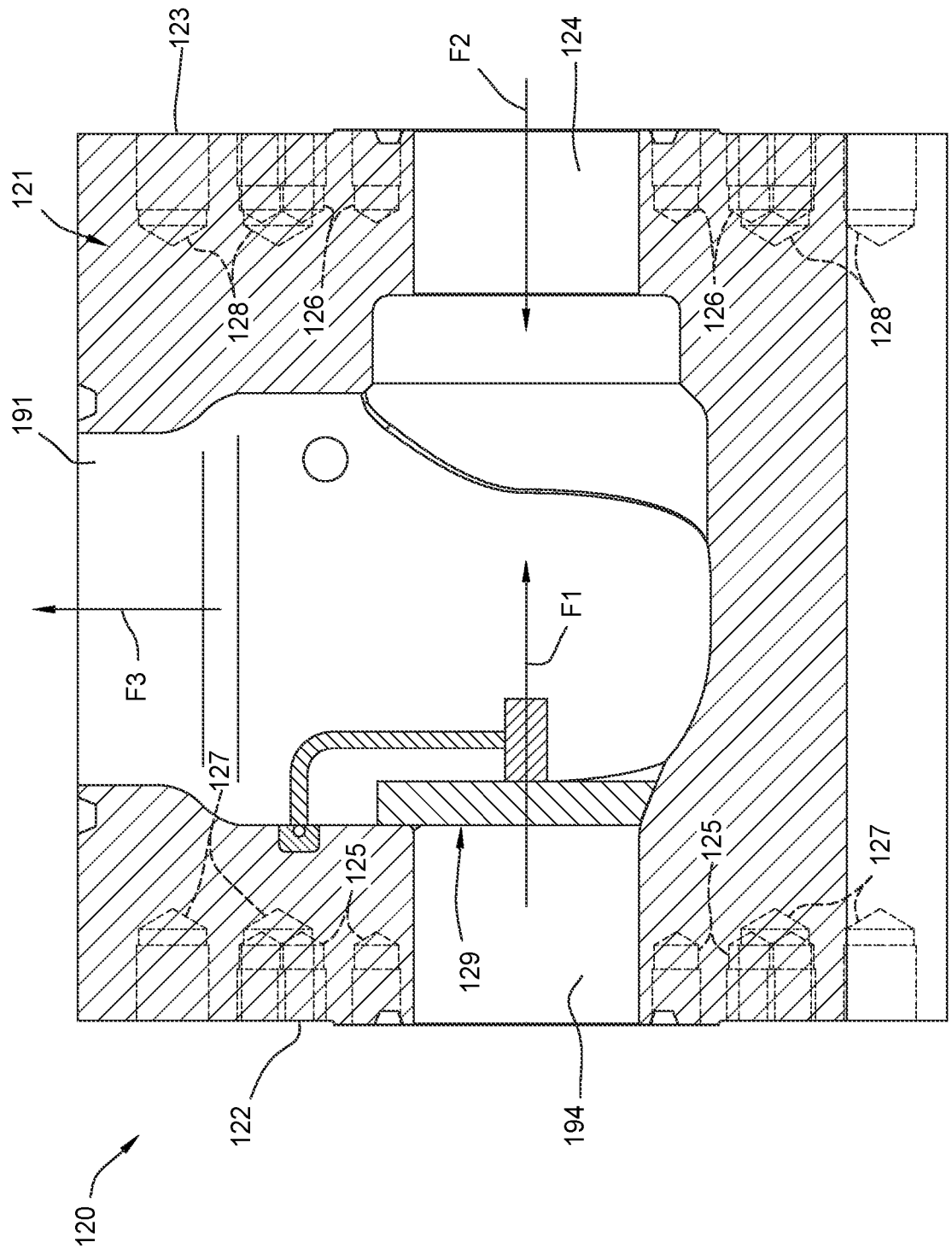
FIG. 14 is a schematic cross-sectional side view of the check valve shown in FIG. 12, along Section 14-14, according to one implementation.

FIG. 12 is a schematic isometric front view of the check valve 120 shown in FIGS. 1 and 2, according to one implementation. FIG. 13 is a schematic isometric back view of the check valve 120 shown in FIGS. 1 and 2, according to one implementation. FIG. 14 is a schematic cross-sectional side view of the check valve 120 shown in FIG. 12, along Section 14-14, according to one implementation.

The check valve 120 includes the check block 121. The check block 121 includes a first check side face 122 and a second check side face 123. The first check side face 122 interfaces with the second gate side face 113. The first side face 142 of the well side block 140 interfaces with the second check side face 123 of the check block 121.

The check block 121 includes a first central opening 194 extending into the first check side face 122 and aligned with the second central opening 115 of the gate block 111, and a second central opening 124 extending into the second check side face 123. The check block 121 includes a plurality of first check openings 125 disposed outwardly of the first central opening 194 of the check block 121 and extending partially into the first check side face 122 of the check block 121. The plurality of first check openings 125 are aligned with the plurality of second gate openings 117 of the gate block 111. The check block 121 includes a plurality of second check openings 126 disposed outwardly of the second central opening 124 of the check block 121 and extending partially into the second check side face 123 of the check block 121.

The check block 121 includes a plurality of third check openings 127 disposed outwardly of the plurality of first check openings 125 of the check block 121. The plurality of third check openings 127 are aligned with the plurality of third gate openings 118 of the gate block 111. The check block 121 includes a plurality of fourth check openings 128 disposed outwardly of the plurality of second check openings 126 of the check block 121.

The check valve 120 includes a movable member, referred to herein as a flapper 129, configured to open and close the first central opening 194 of the check block 121. The flapper 129 is shown in FIG. 14. The check block 121 includes a bypass opening 191 intersecting the first central opening 194 and the second central opening 124. When fluid flows in a first direction F1, such as during a frac operation, the flapper 129 is in an open position and the fluid flows to wellheads through the second central opening 124. When fluid flows in a second direction F2, such as during backflow when frac pumps are turned off, the flapper 129 is in a closed position, and the fluid flow is directed out through the bypass opening 191 in a bypass direction F3.

The central opening 144 of the well side block 140 is aligned with the second central opening 124 of the check block 121. The plurality of first openings 145 of the well side block 140 are aligned with the plurality of second check openings 126 of the check block 121. The plurality of third openings 147 of the well side block 140 are aligned with the plurality of fourth check openings 128 of the check block 121.

Figure 15:
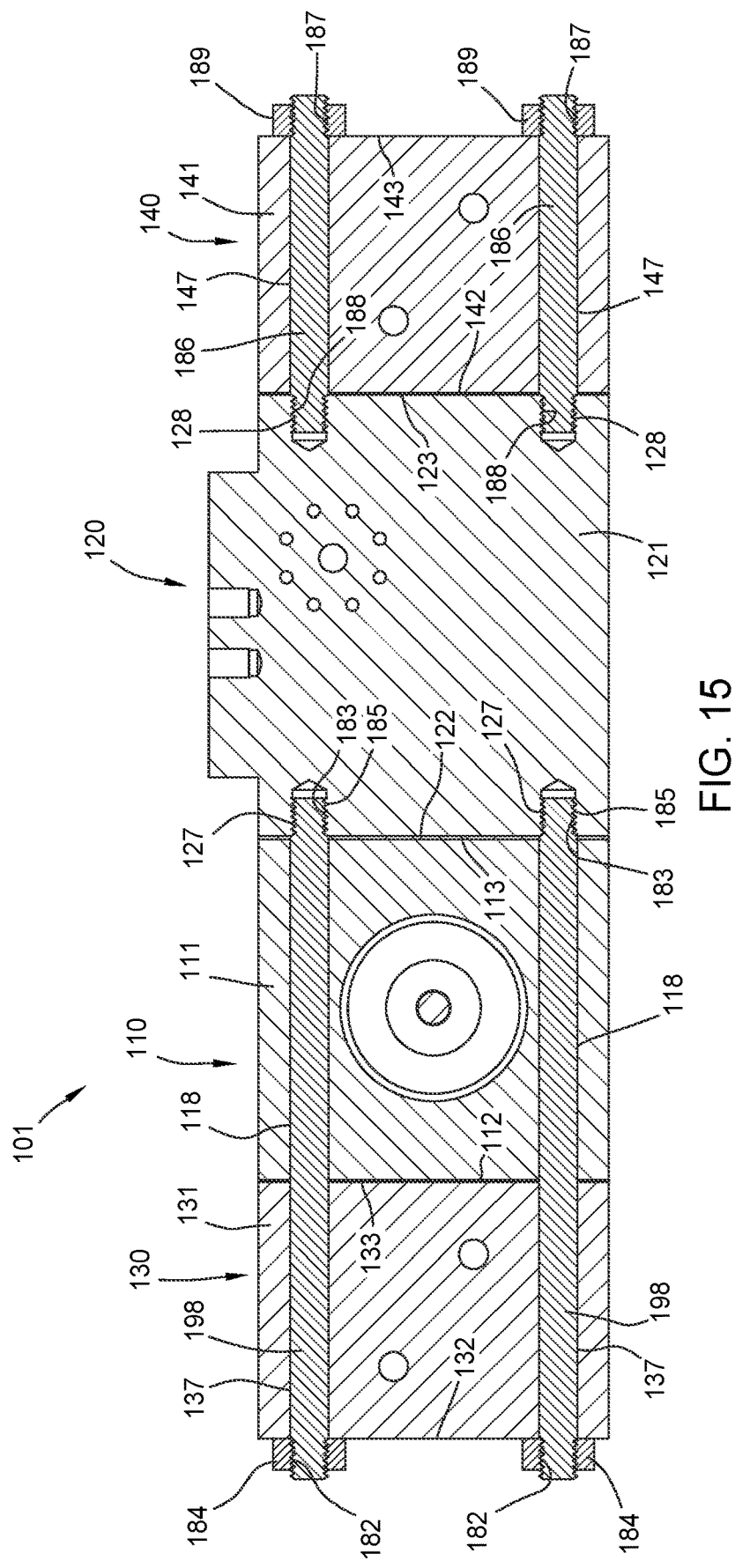
FIG. 15 is a schematic cross-sectional side view of the valve skid shown in FIGS. 1 and 2, along Section 15-15, according to one implementation.

FIG. 15 is a schematic cross-sectional side view of the valve skid 101 along Section 15-15 shown in FIG. 1, according to one implementation. The pump side block 130, the gate valve 110, and the check valve 120 are coupled together using a plurality of first through-rods 198 (eight are included) disposed through the plurality of third openings 137 of the pump side block 130, through the plurality of third gate openings 118 of the gate block 111, and into the plurality of third check openings 127 of the check block 121.

Each of the plurality of first through-rods 198 includes a first threaded end 182 disposed outwardly of the first side face 132 of the pump side block 130, and a second threaded end 183 disposed inwardly of the first check side face 122 of the check block 121. Each of the plurality of first through-rods 198 includes a threaded nut 184 threaded onto the respective first threaded end 182. The second threaded end 183 of each first through-rod 198 is threaded into a threaded inner face 185 defined at least partially by a respective third check opening 127.

The check valve 120 and the well side block 140 are coupled together using a plurality of second through-rods 186 disposed through the plurality of third openings 147 of the well side block 140 and into the plurality of fourth check openings 128 of the check block 121. Each of the plurality of second through-rods 186 includes a first threaded end 187 disposed outwardly of the second side face 143 of the well side block 140, and a second threaded end 188 disposed inwardly of the second check side face 123 of the check block 121. Each of the plurality of second through-rods 186 includes a threaded nut 189 threaded onto the respective first threaded end 187.

FIG. 16 is a schematic cross-sectional side view of the valve skid 101 along Section 16-16 shown in FIG. 1, according to one implementation. In one embodiment, which can be combined with other embodiments, each of the first and second openings 116, 117, 125, 126, 135, 136, 145, 146 is sized and configured to couple to a flange (such as an API flange) of a conduit (such as flow iron or flexible hose). In one embodiment, which can be combined with other embodiments, a plurality of first stay rods 171 (such as roll pins) are disposed in the first gate openings 116 and the second openings 136 to reduce or eliminate relative rolling (such as pivoting or rotating) between the pump side block 130 and the gate block 111. In one embodiment, which can be combined with other embodiments, a plurality of second stay rods 176 (such as roll pins) are disposed in the second check openings 126 and the first openings 145 to reduce or eliminate relative rolling (such as pivoting or rotating) between the check block 121 and the well side block 140. In one embodiment, which can be combined with other embodiments, a plurality of third stay rods 173 (such as roll pins) are disposed in the second gate openings 117 and the first check openings 125 to reduce or eliminate relative rolling (such as pivoting or rotating) between the gate block 111 and the check block 121. Each of the stay rods 171-173 can be threaded.

The first and second fasteners 163, 166 each include a threaded rod (such as a threaded stud) and a threaded nut threaded onto the respective threaded rod.

The pump side block 130, the gate valve 110, the check valve 120, and the well side block 140 are coupled together without the use of flanged connections, flow iron connections, or flexible hose connections positioned therebetween, facilitating reduced cost and material expenditure, reduced weight, reduced space occupation footprint, and reduced complexity.

The present disclosure contemplates that the pump side block 130, the gate block 111, the check block 121, and the well side block 140 can include openings that fluidly couple to pressure transducers, measurement instrumentation, and/or water lines.

Figure 17:
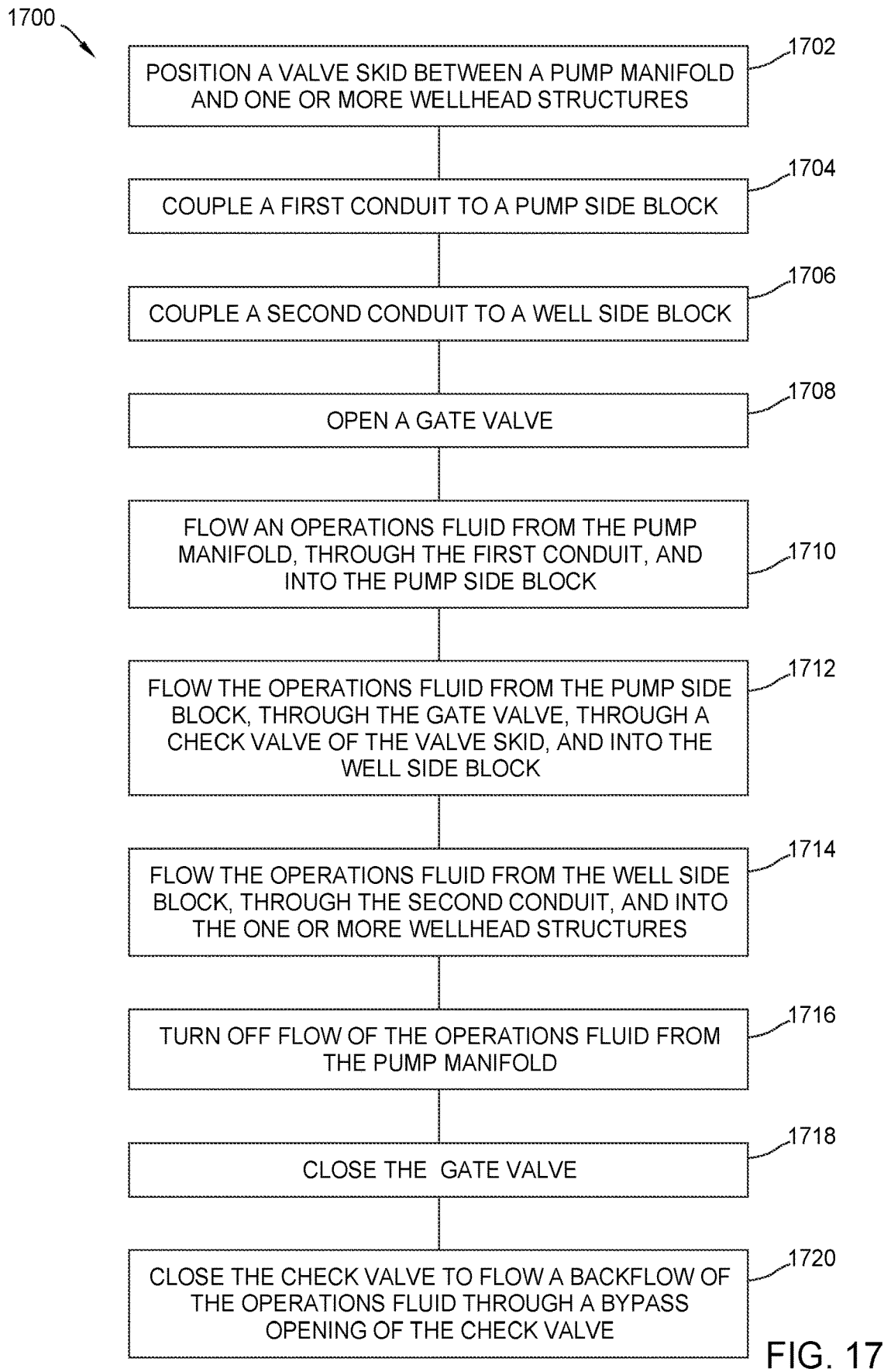
FIG. 17 is a schematic block diagram view of a method of conducting a wellsite operation, according to one implementation.

FIG. 17 is a schematic block diagram view of a method 1700 of conducting a wellsite operation, according to one implementation.

Operation 1702 includes positioning a valve skid between a pump manifold and one or more wellhead structures. In one embodiment, which can be combined with other embodiments, the one or more wellhead structures include Christmas trees. Operation 1704 includes coupling a first conduit to a pump side block of the valve skid. Operation 1706 includes coupling a second conduit to a well side block of the valve skid.

Operation 1708 includes opening a gate valve of the valve skid. Operation 1710 includes flowing an operations fluid from the pump manifold, through the first conduit, and into the pump side block. Operation 1712 includes flowing the operations fluid from the pump side block, through the gate valve, through a check valve of the valve skid, and into the well side block. Operation 1714 includes flowing the operations fluid from the well side block, through the second conduit, and into the one or more wellhead structures.

Operation 1716 includes turning off flow of the operations fluid from the pump manifold. Operation 1718 includes closing the gate valve of the valve skid. Operation 1720 includes closing the check valve to flow a backflow of the operations fluid through a bypass opening of the check valve.

Benefits of the present disclosure include coupling together on a single skid the pump side block 130, the gate valve 110, the check valve 120, and the well side block 140 without the use of flanged connections, flow iron connections, or flexible hose connections positioned therebetween; reduced cost; reduced material expenditure; reduced weight; reduced space occupation footprint; and reduced complexity. The reduced weight facilitates ease of transportation of the valve skid and reduced expenditure of resources for the transportation. Benefits of the present disclosure also include reduced numbers of skids and other components; reduced expenditure of resources; reduced operational times; and enhanced operational efficiencies.

It is contemplated that one or more of the aspects disclosed herein may be combined. Moreover, it is contemplated that one or more of these aspects may include some or all of the aforementioned benefits. As an example, the present disclosure contemplates that one or more aspects, operations, features, components, and/or properties of the valve skid 101 and the method 1700 may be combined.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

We claim:

1. A valve skid, comprising:
   a gate valve comprising a gate block, the gate block comprising a first gate side face, a second gate side face, and a first central opening extending from the first gate side face to the second gate side face;
   a check valve coupled to the gate valve, the check valve comprising a check block, the check block comprising a first check side face, a second check side face, and a second central opening extending from the first check side face to the second check side face, the first check side face interfacing with the second gate side face;
   a pump side block coupled to the gate valve, the pump side block comprising a first side face, a second side face, and a third central opening extending from the first side face of the pump side block to the second side face of the pump side block, the second side face of the pump side block interfacing with the first gate side face; and
   a well side block coupled to the check valve, the well side block comprising a first side face, a second side face, and a fourth central opening extending from the first side face of the well side block to the second side face of the well side block, the first side face of the well side block interfacing with the second check side face, wherein
   the first central opening, the second central opening, the third central opening, and the fourth central opening are aligned.

2. The valve skid of claim 1, further comprising:
   a first pressure relief valve coupled to a top face of the pump side block; and
   a first bleed-off valve coupled to a top face of the first pressure relief valve.

3. The valve skid of claim 2, further comprising:
   a second pressure relief valve coupled to a top face of the well side block; and
   a second bleed-off valve coupled to a top face of the second pressure relief valve.

4. The valve skid of claim 1, wherein the pump side block, the gate valve, and the check valve are coupled together using a plurality of first through-rods disposed through the pump side block, through the gate block, and partially into the check block.

5. The valve skid of claim 4, wherein each of the plurality of first through-rods comprises:
   a first threaded end disposed outwardly of the first side face of the pump side block; and
   a second threaded end disposed inwardly of the first check side face of the check block.

6. The valve skid of claim 4, wherein the check valve and the well side block are coupled together using a plurality of second through-rods disposed through the well side block and partially into the check block.

7. The valve skid of claim 6, wherein each of the plurality of second through-rods comprises:
   a first threaded end disposed outwardly of the second side face of the well side block; and
   a second threaded end disposed inwardly of the second check side face of the check block.

8. The valve skid of claim 1, wherein the valve skid is an instrumentation skid, and the valve skid further comprises one or more metering valves or one or more flow composition valves.

9. A valve skid, comprising:
   a gate valve comprising a gate block, the gate block comprising:
      a first gate side face,
      a second gate side face, and
      a first central opening extending from the first gate side face to the second gate side face,
   a check valve coupled to the gate valve, the check valve comprising:
      a check block, the check block comprising:
         a first check side face, the first check side face interfacing with the second gate side face;
         a second check side face; and
         a second central opening extending from the first check side face to the second check side face;
   a pump side block coupled to the gate valve, the pump side block comprising:
      a first side face;
      a second side face, the second side face of the pump side block interfacing with the first gate side face;
      a third central opening extending from the first side face of the pump side block to the second side face of the pump side block;
      a plurality of first openings disposed outwardly of the third central opening of the pump side block and extending partially into the first side face of the pump side block;
      a plurality of second openings disposed outwardly of the third central opening of the pump side block and extending partially into the second side face of the pump side block; and
      a plurality of third openings disposed outwardly of the plurality of first openings of the pump side block and outwardly of the plurality of second openings of the pump side block; and
   a well side block coupled to the check valve, the well side block comprising:
      a first side face, the first side face of the well side block interfacing with the second check side face;
      a second side face;
      a fourth central opening extending from the first side face of the well side block to the second side face of the well side block;
      a plurality of first openings disposed outwardly of the fourth central opening of the well side block and extending partially into the first side face of the well side block;
      a plurality of second openings disposed outwardly of the fourth central opening of the well side block and extending partially into the second side face of the well side block; and
      a plurality of third openings disposed outwardly of the plurality of first openings of the well side block and outwardly of the plurality of second openings of the well side block, wherein
   the first central opening, the second central opening, the third central opening, and the fourth central opening are aligned.

10. The valve skid of claim 9, wherein the gate block comprises:
    a plurality of first gate openings disposed outwardly of the first central opening of the gate block and extending partially into the first gate side face of the gate block, wherein the plurality of first gate openings are aligned with the plurality of second openings of the pump side block;

a plurality of second gate openings disposed outwardly of the first central opening of the gate block and extending partially into the second gate side face of the gate block; and a plurality of third gate openings disposed outwardly of the plurality of first gate openings of the gate block and outwardly of the plurality of second gate openings of the gate block, wherein the plurality of third gate openings are aligned with the plurality of third openings of the pump side block.

11. The valve skid of claim 10, wherein the check block comprises:

a plurality of first check openings disposed outwardly of the second central opening of the check block and extending partially into the first check side face of the check block, wherein the plurality of first check openings are aligned with the plurality of second gate openings of the gate block;

a plurality of second check openings disposed outwardly of the second central opening of the check block and extending partially into the second check side face of the check block;

a plurality of third check openings disposed outwardly of the plurality of first check openings of the check block, wherein the plurality of third check openings are aligned with the plurality of third gate openings of the gate block; and a plurality of fourth check openings disposed outwardly of the plurality of second check openings of the check block.

12. The valve skid of claim 11, wherein the well side block comprises:

a plurality of first openings disposed outwardly of the third central opening of the well side block and extending partially into the first side face of the well side block, wherein the plurality of first openings of the well side block are aligned with the plurality of second check openings of the check block;

a plurality of second openings disposed outwardly of the third central opening of the well side block and extending partially into the second side face of the well side block; and a plurality of third openings disposed outwardly of the plurality of first openings of the well side block and outwardly of the plurality of second openings of the well side block, wherein the plurality of third openings of the well side block are aligned with the plurality of fourth check openings of the check block.

13. The valve skid of claim 12, further comprising:
a first pressure relief valve coupled to a top face of the pump side block; and
a first bleed-off valve coupled to a top face of the first pressure relief valve.

14. The valve skid of claim 13, further comprising:
a second pressure relief valve coupled to a top face of the well side block; and
a second bleed-off valve coupled to a top face of the second pressure relief valve.

15. The valve skid of claim 12, wherein the pump side block, the gate valve, and the check valve are coupled together using a plurality of first through-rods disposed through the plurality of third openings of the pump side block, through the plurality of third gate openings of the gate block, and into the plurality of third check openings of the check block.

16. The valve skid of claim 15, wherein each of the plurality of first through-rods comprises:
a first threaded end disposed outwardly of the first side face of the pump side block; and
a second threaded end disposed inwardly of the first check side face of the check block.

17. The valve skid of claim 15, wherein the check valve and the well side block are coupled together using a plurality of second through-rods disposed through the plurality of third openings of the well side block and into the plurality of fourth check openings of the check block.

18. The valve skid of claim 17, wherein each of the plurality of second through-rods comprises:
a first threaded end disposed outwardly of the second side face of the well side block; and
a second threaded end disposed inwardly of the second check side face of the check block.

19. The valve skid of claim 12, wherein the valve skid is an instrumentation skid, and the valve skid further comprises one or more metering valves or one or more flow composition valves.

20. The valve skid of claim 12, wherein the gate valve further comprises a movable gate positioned within the gate block, the movable gate comprising a gate opening configured to open and close the first central opening of the gate block, and the check valve further comprises a movable plate or flapper configured to open and close the second central opening of the check block.

* * * * *